United States Patent
Nanasawa

(10) Patent No.: US 11,215,228 B2
(45) Date of Patent: Jan. 4, 2022

(54) BALL BEARING AND BEARING UNIT

(71) Applicant: NSK LTD., Tokyo (JP)

(72) Inventor: Toru Nanasawa, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/965,199

(22) PCT Filed: Jan. 31, 2019

(86) PCT No.: PCT/JP2019/003524
§ 371 (c)(1),
(2) Date: Jul. 27, 2020

(87) PCT Pub. No.: WO2019/151456
PCT Pub. Date: Aug. 8, 2019

(65) Prior Publication Data
US 2021/0062867 A1    Mar. 4, 2021

(30) Foreign Application Priority Data
Feb. 1, 2018 (JP) .............................. JP2018-016277

(51) Int. Cl.
*F16C 33/41* (2006.01)
*F16C 19/16* (2006.01)

(52) U.S. Cl.
CPC ............ *F16C 33/418* (2013.01); *F16C 19/16* (2013.01)

(58) Field of Classification Search
CPC .... F16C 33/3997; F16C 33/41; F16C 33/412; F16C 33/414; F16C 33/416; F16C 33/418;
(Continued)

(56) References Cited

U.S. PATENT DOCUMENTS 8,920,038 B2 * 12/2014 Varnoux ............... F16C 33/416
384/523
9,011,016 B2 * 4/2015 Adane .................. F16C 19/166
384/531
(Continued)

FOREIGN PATENT DOCUMENTS

JP        2005-61434 A    3/2005
JP        3122529 U       6/2006
(Continued)

OTHER PUBLICATIONS

International Search Report (PCT/ISA/210) dated Apr. 16, 2019 by the International Searching Authority in counterpart International Patent Application No. PCT/JP2019/003524.
(Continued)

*Primary Examiner* — Alan B Waits
(74) *Attorney, Agent, or Firm* — Sughrue Mion, PLLC

(57) ABSTRACT

A ball bearing includes an inner ring, an outer ring, a plurality of balls rollably provided between the inner ring and the outer ring, and a cage configured to hold the plurality of balls at equal intervals in a circumferential direction. The cage includes a plurality of pockets configured to hold the balls. The plurality of pockets include at least two types of pockets including a first pocket and a second pocket. A gap on each of an outer circumferential surface side and an inner circumferential surface side of the cage between the ball and an inner circumferential surface of the second pocket is larger than a gap on each of the outer circumferential surface side and the inner circumferential surface side of the cage between the ball and an inner circumferential surface of the first pocket.

7 Claims, 8 Drawing Sheets

(58) Field of Classification Search
CPC ........ F16C 19/06; F16C 19/16; F16C 19/163; F16C 19/18; F16C 19/181; F16C 19/182; F16C 33/3887
See application file for complete search history.

(56) References Cited

U.S. PATENT DOCUMENTS

| | | | |
|---|---|---|---|
| 9,097,282 B2 * | 8/2015 | Adane | F16C 33/416 |
| 2003/0235357 A1 * | 12/2003 | Hiramatsu | F16C 19/163 |
| | | | 384/513 |
| 2013/0163909 A1 * | 6/2013 | Sakaguchi | F16C 33/418 |
| | | | 384/470 |
| 2015/0003768 A1 * | 1/2015 | Adane | F16C 33/418 |
| | | | 384/531 |
| 2018/0223906 A1 * | 8/2018 | Kamamoto | F16C 33/416 |

FOREIGN PATENT DOCUMENTS

| | | |
|---|---|---|
| JP | 2009-138863 A | 6/2009 |
| JP | 2015-10715 A | 1/2015 |
| JP | 2016-180436 A | 10/2016 |
| JP | 2017-166523 A | 9/2017 |

OTHER PUBLICATIONS

Written Opinion (PCT/ISA/237) dated Apr. 16, 2019 by the International Searching Authority in counterpart International Patent Application No. PCT/JP2019/003524.

* cited by examiner

BALL BEARING AND BEARING UNIT

CROSS-REFERENCE TO RELATED APPLICATIONS

This application is a National Phase Entry of PCT International Application No. PCT/JP2019/003524 filed Jan. 31, 2019, which claims priority to Japanese Patent Application No. 2017-016277 filed Feb. 1, 2018.

TECHNICAL FIELD

The present invention relates to a ball bearing and a bearing unit. For example, the present invention relates to a ball bearing and a bearing unit used for supporting a swing arm of a hard disk drive.

BACKGROUND ART

A swing arm of a current hard disk drive (hereinafter also referred to as HDD) is generally supported by a pivot bearing unit 10 including two small bearings shown in FIG. 1.

The pivot bearing unit 10 includes a shaft 12 erected on a base of the a sleeve 18 on which the swing area is mounted, and a pair of ball bearings 14 provided between the shaft 12 and the sleeve 18. The sleeve 18 may be molded integrally With a spacer 20. The sleeve 18 may also be omitted so that the swing arm may be directly mounted on an outer ring 31 of the bearing.

The ball bearing 14 includes an inner ring 30 and the outer ring 31 serving as a pair of bearing rings facing each other and rotatable relative to each other, a plurality of balls 32 rollably provided between the inner ring 30 and the outer ring 31, and a cage 33 that holds the plurality of balls 32 at equal intervals in a circumferential direction. The ball bearing 14 is generally lubricated by grease sealed in the bearing. The ball bearing 14 further includes one or a pair of non-contact shield members 34 respectively provided on one or two sides between the inner ring 30 and the outer ring 31 to seal the inside of the bearing. Accordingly, foreign matters (for example, dust) are prevented from intruding from outside of the bearing and grease composition sealed in the bearing is prevented from leaking out of the bearing.

As shown in FIG. 2, the cage 33 is a synthetic, resin-made crown cage and is formed with a plurality of spherical pockets 41A at predetermined intervals in the circumferential direction. Each of the plurality of spherical pockets 41A has an opening on one side thereof in an axial, direction. In FIG. 2, a reference numeral 42 denotes an annular body of the cage 33, a reference numeral 43 denotes a pillar portion, and a reference numeral 44 denotes a claw portion. Currently, a synthetic resin-made crown cage is generally used for requirements such as low torque and mass productivity.

In the ball bearing 14, the inner ring 30 is fitted onto the shaft 12 and the outer ring 31 is fitted into the sleeve 18. The annular spacer 20 provided between the pair of ball bearings 14 is fitted to a portion of the sleeve 18 on an inner circumferential side. Accordingly, the pair of ball bearings 14 are fixed at predetermined positions with predetermined preload applied thereto.

A crown cage for a ball bearing known in the related art has pockets each having a spherical shaped first pocket surface formed on an outer ring side of the bearing in a radial direction and a cylindrical shaped second pocket surface formed on an inner ring side of the bearing in the radial direction to prevent oil particles (for example, see Patent Literature 1).

CITATION LIST

Patent Literature

Patent Literature 1: JP-A-2016-180436

SUMMARY OF INVENTION

Technical Problem

In recent years, however, the HDD is required to be cleaner inside with higher speed and larger density of the HDD, and oil particles generated from the bearing may become a problem. The grease used for lubricating the bearing is stirred inside the bearing by the rotation of the bearing, and a part of oil components contained in the grease becomes fine droplets, which are the oil particles. When the oil particles scatter out of the bearing and adhere to a magnetic disk, a read head, or the like inside the HDD, defects such as a decrease in performance, a read/write error, and a failure of the HDD may occur.

FIG. 3 is a cross-sectional view of a part of the hall 32 and the pocket 41A in the current general crown cage 33, and shows a state in which the ball 32 rolls and comes into contact with a wall on one side of the pocket 41A of the cage 33 in the circumferential direction. In a case of the cage of Patent Literature 1 that has current general spherical pockets as shown in FIG. 6 in Patent Literature 1, a diameter of the pocket 41A is slightly larger than a diameter of the ball 32 so as not to hinder rolling of the ball 32.

Since the diameter of the pocket 41A and the diameter of the ball 32 are substantially the same, an actual contact point P between the cage 33 and the ball 32 is a point on a pitch circle diameter (P.C.D.) of the ball 32. However, no gap can be ensured between edge portions (two end edges in the radial direction) E of the pocket 41A and the ball 32, the grease is scraped off at the edge portions E with the rolling of the ball 32, and oil particles may be generated.

The cage of Patent Literature 1 also has room for improvement in terms of mass production cost.

Although various methods for reducing oil particles have been studied, the required cleanliness level is advanced year by year, and there is room for improvement in the reduction of the oil particles.

The present invention has been made in view of the above-described problems and an object thereof is to provide a ball bearing and a bearing unit that can reduce oil particles.

Solution to Problem

The object of the present invention is achieved by the following configurations.

(1) A ball bearing including:
an inner ring;
an outer ring;
a plurality of balls rollably provided between the inner ring and the outer ring; and
a cage configured to hold the plurality of balls at equal intervals in a circumferential direction, wherein
the cage includes a plurality of pockets configured to hold the balls, the plurality of pockets include at least two types of pockets including a first pocket and a second pocket, and a gap on each of an outer circumferential surface side and an inner circumferential surface side of the cage between the ball and an inner circumferential surface of the second pocket is larger than a gap on each of the outer circumferential surface side and the inner circumferential surface side of the cage between the ball and an inner circumferential surface of the first pocket.

(2) The ball bearing according to (1), wherein a radius of curvature of the inner circumferential surface of the first pocket is 1.02 to 1.06 times a radius of the ball.

(3) A bearing unit comprising the ball bearing according to (1) or (2).

Effects of Invention

According to the present invention, the plurality of pockets of the cage include at least two types of pockets including the first pocket and the second pocket, and the gap on each of the outer circumferential surface side and the inner circumferential surface side of the cage between the ball and the inner circumferential surface of the second pocket is larger than the gap on each of the outer circumferential surface side and the inner circumferential surface side of the cage between the ball and the inner circumferential surface of the first pocket. Accordingly, grease is prevented from being scrapped by the cage and oil particles can be reduced.

DESCRIPTION OF EMBODIMENTS

Hereinafter, an embodiment of a ball bearing and a bearing unit according to the present invention will be described in detail with reference to the drawings.

The present invention relates to improvement of a crown cage. A structure of a ball bearing including the crown cage and a structure of a pivot bearing unit including the ball bearing are the same as those shown in FIG. 1 except of the crown cage. A basic structure of the crown cage is the same as that shown in FIG. 2.

Figure 2:
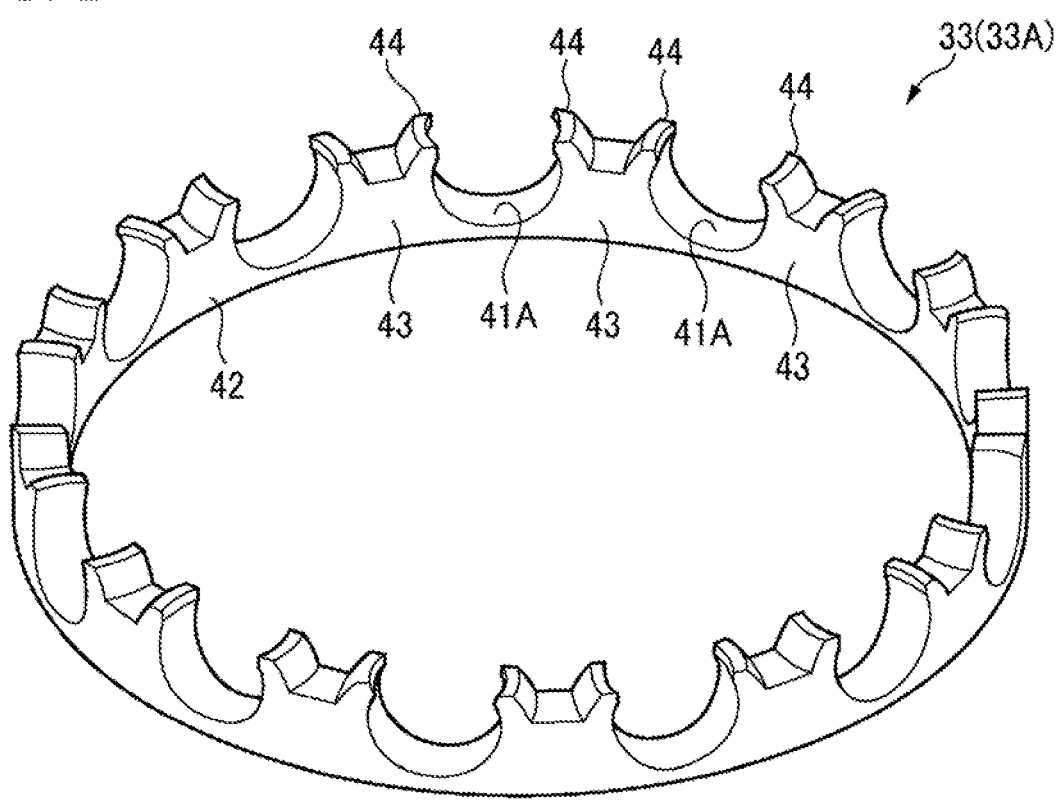
FIG. 2 is a perspective view showing a crown cage.
Figure 4:
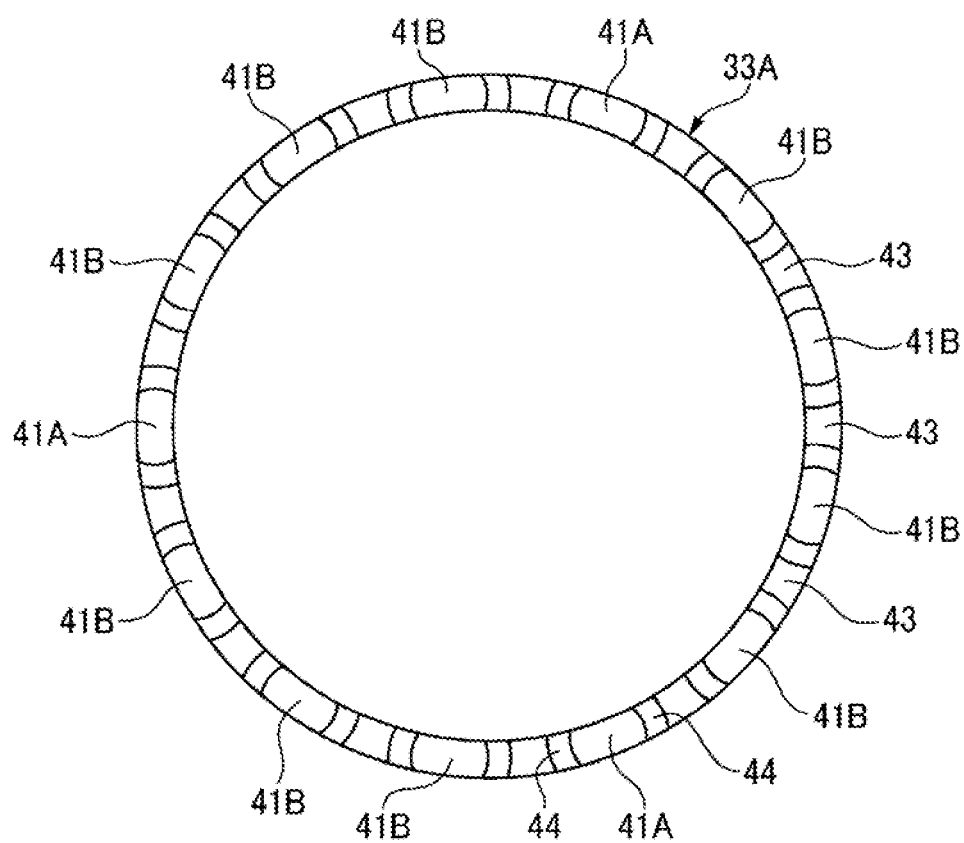
FIG. 4 is a plan view of a crown cage provided in a ball bearing according to the present invention.

As shown in FIGS. 2 and 4, a crown cage 33A according to the present embodiment includes the annular body 42, a plurality of pillar portions 43 provided at predetermined intervals in the circumferential direction and extending in the axial direction from the body 42, and claw portions 44, 44 each formed on one side of each of the pillar portions 43 in the axial direction and on two sides of each of the pillar portions 43 in the circumferential direction.

The crown cage 33A according to the present embodiment is a resin cage made of a polyamide resin such as polyamide 66 and reinforcing fibers such as 10 mass % glass fibers. The crown cage 33A is a cage configured to guide balls.

Figure 1:
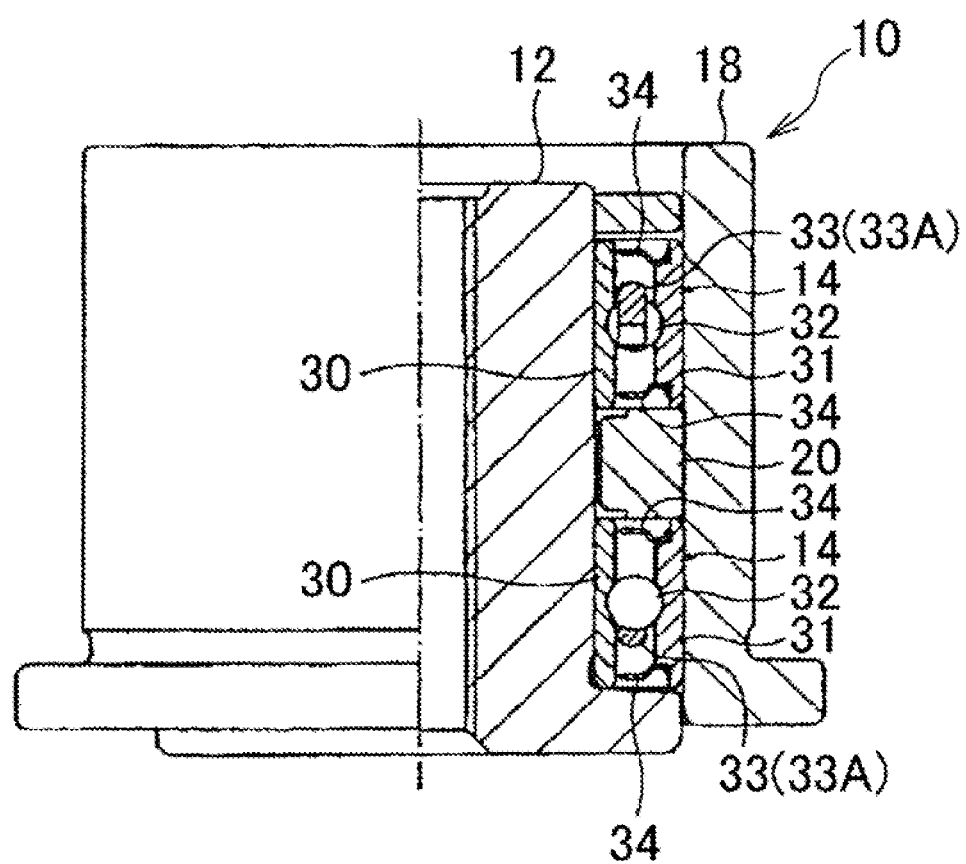
FIG. 1 is a semi-cross-sectional view showing a pivot bearing unit.
Figure 3:
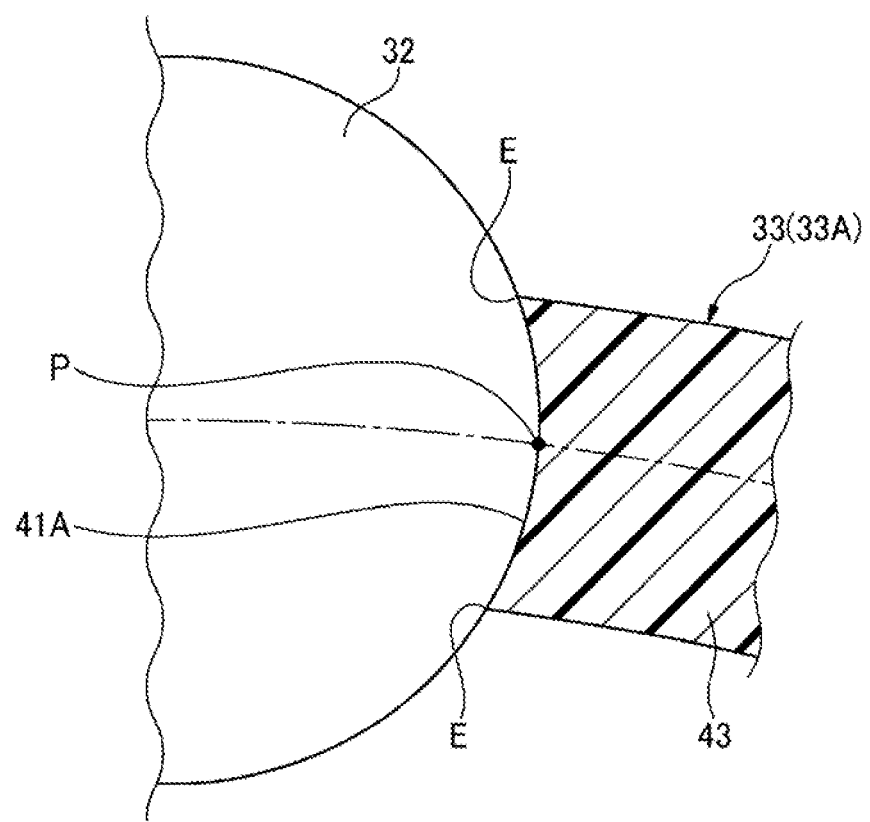
FIG. 3 is a cross-sectional view of a part of a ball and a pocket in a general crown cage.
Figure 5:
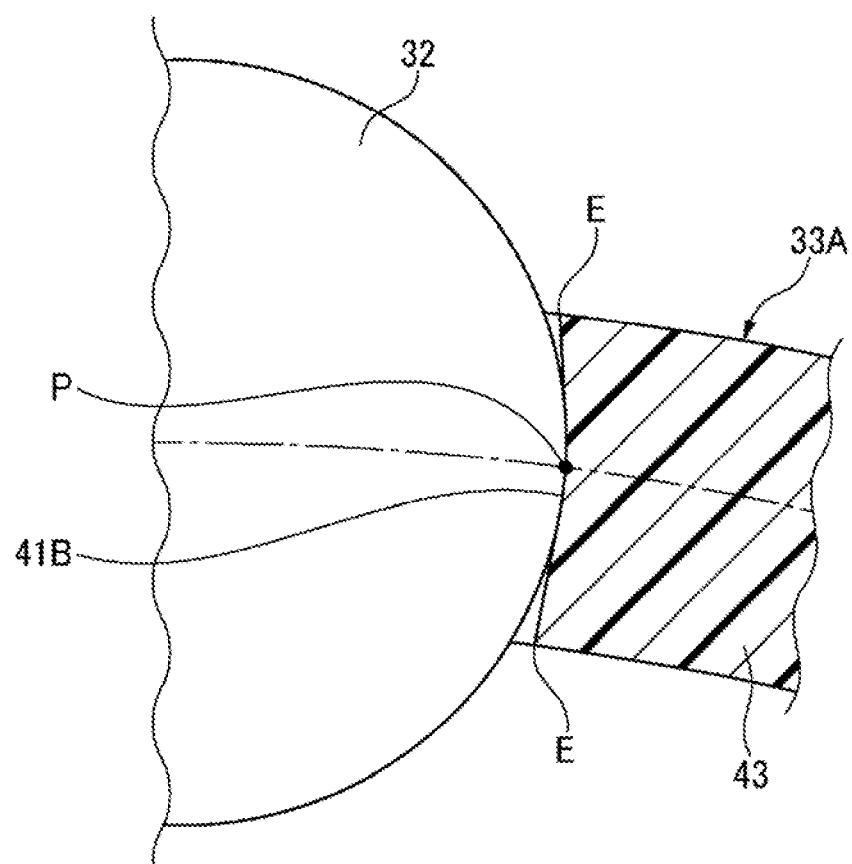
FIG. 5 is a cross-sectional view of a part of a ball and a second pocket in the crown cage according to the present invention.

In the present embodiment, as shown in FIG. 1, one cage includes a first pocket 41A that is a first type of pocket shown in FIG. 3 and a second pocket 41B that is a second type of pocket shown in FIG. 5 that prevents grease from scraping. That is, a plurality of pockets configured to hold the balls include at least two types of pockets. The number of the types of the pockets are not limited to two, and the number of the types of the pockets may be three or more by increasing the number of the types of the second pocket.

The first pocket 41A is the general spherical pocket shown in FIG. 3.

A radius of curvature of an inner circumferential surface of the first pocket 41A is preferably 1.02 to 1.06 times a radius of the ball 32 in order to reduce a movement amount of the cage 33A in the radial direction.

As shown in FIG. 5, the second pocket 41B has a shape in which a gap between each of the edge portions E on two sides of the second pocket 41B in the radial direction and the ball 32 is ensured when the cage 33A and the ball 32 come into contact with each other. That is, a gap on each of an outer circumferential surface side and an inner circumferential surface side of the cage between the ball 32 and an inner circumferential surface side of the second pocket 41B is larger than a gap on each of the outer circumferential surface side and the inner circumferential surface side of the cage between the ball 32 and the inner circumferential surface of the first pocket 41A. In the present invention, the second pocket 41B has functions to prevent the grease from scraping and to reduce oil particles since the gap between each of the edge portions F and the ball 32 is ensured.

Specifically, the second pocket 41B preferably has a concave shape. Examples of the shape of the second pocket 41B include that the inner circumferential surface of the second pocket 41B has a radius of curvature larger than the radius of the ball 32 (see FIG. 5), the inner circumferential surface of the second pocket 41B is formed by a plurality of curved surfaces instead of a single curved surface (see FIG. 6), at least a part of the inner circumferential surface of the second pocket 41B has a radius of curvature larger than the radius of curvature of the first pocket 41A (see FIGS. 5 and 6), and the inner circumferential surface of the second pocket 41B has an elliptical shape having a long axis in the radial direction of the cage.

For example, as shown in FIG. 5, when the inner circumferential surface of the second pocket 41B is formed by a single curved surface and the radius of curvature of the inner circumferential surface of the second pocket 41B is larger than the radius of the ball 32 to ensure a gap, the radius of curvature of the inner circumferential surface of the second pocket 41B is preferably larger than 1.06 times the radius of the ball 32 to ensure the gap between each of the edge portions E and the ball 32, and is preferably 1.10 times the radius of the ball 32 or less for stability of the cage.

Figure 6:
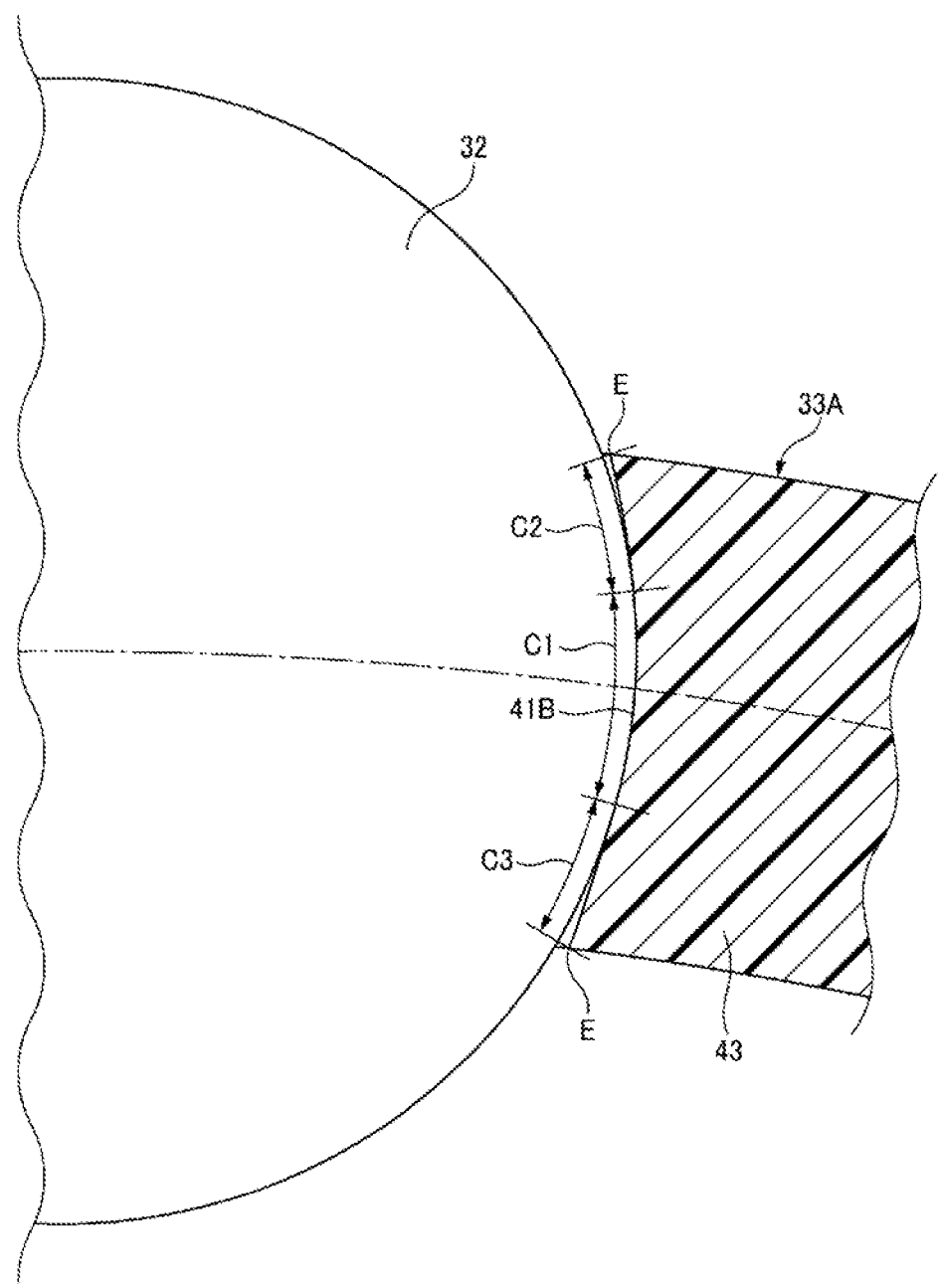
FIG. 6 is a cross-sectional view showing a case where an inner circumferential surface of the second pocket is formed by a plurality of curved surfaces.

When the inner circumferential surface of the second pocket 41B is formed by a plurality of curved surfaces to ensure a gap, as shown in FIG. 6, the inner circumferential surface of the second pocket 41B has a first curved surface C1 located on a central side of the cage 33A in the radial direction, a second curved surface C2 located radially outward of the first curved surface C1, and a third curved surface C3 located radially inward of the first curved surface C1. A radius of curvature of the first curved surface C1 is preferably 1.02 to 1.06 times the radius of the ball 32, and a radius of curvature of the second curved surface C2 and a radius of curvature of the third curved surface C3 are larger than the radius of curvature of the first curved surface C1. The radius of curvature of the second curved surface C2 and the radius of curvature of the third curved surface C3 may be the same with or different from each other. In this case, since the second curved surface C2 on an outer diameter side and the third curved surface C3 on an inner diameter side are larger than the radius of the ball 32, the gap between each of the edge portions E of the second pocket 41B and the ball 32 can be ensured and the edge portions E and the ball 32 can be avoided from coming into contact with each other.

Figure 7:
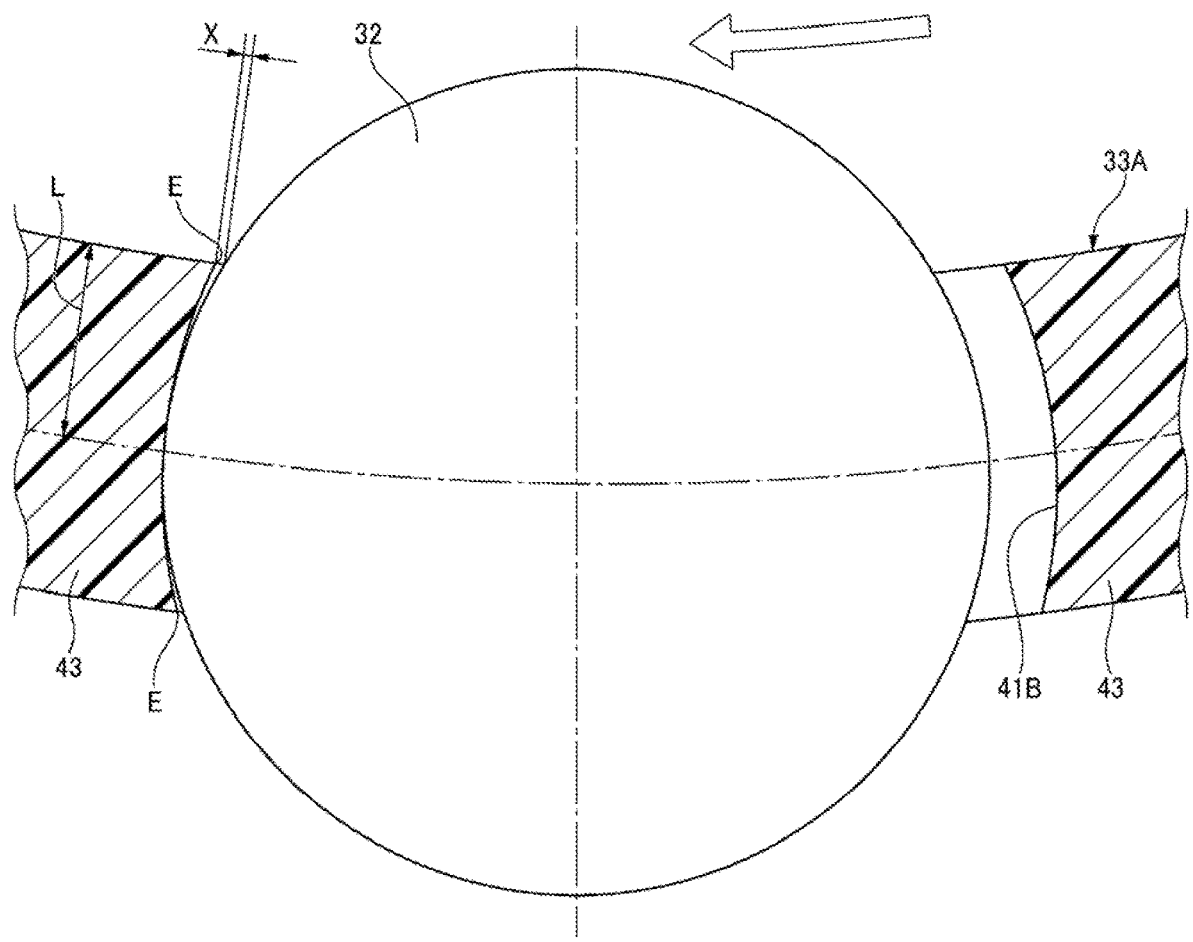
FIG. 7 is a cross-sectional view showing a concept of a gap between an edge portion of the second pocket and the ball.

Next, the gap between each of the edge portions F of the second pocket 41B and the ball 32 will be described with reference to FIG. 7. Generally in a cage, a pitch circle diameter (P.C.D.) of a pocket and a pitch circle diameter (P.C.D.) of a ball are designed to be concentric. Accordingly, a gap between an edge portion of the pocket and the ball is set based on this fact that the pitch circle diameters of a pocket and a ball are concentric. In FIG. 7, the pitch circle diameter (P.C.D.) of the pocket of the cage and the pitch circle diameter (P.C.D.) of the ball are concentric.

As shown in FIG. 7, the ball 32 moves in a rotation direction (arrow direction in FIG. 7) when the bearing rotates. Accordingly, the ball 32 comes into contact with the inner circumferential surface of the second pocket 41B. Here, a gap size in the circumferential direction from the edge portion E to a surface of the ball 32 in this state is defined as X, and a distance in the radial direction from the design pitch circle diameter (P.C.D.) of the pocket of the cage to a radial end of the cage is defined as L The gap size X and the distance L are defined on both of the inner diameter side and the outer diameter side, and a larger gap size X on the inner or outer diameter side is defined as a design criterion.

A width of the cage in the radial direction, which is a thickness between the inner circumferential surface and the outer circumferential surface of the cage, is preferably 60% to 90% of a diameter of the ball front a viewpoint of a minimum required strength and prevention of interference with the inner ring and the outer ring.

In order to reduce an amount of oil particles, the gap size X, at least on the inner or outer diameter side where the gap size X is larger, desirably has a relationship of 1.8%≤X/L between the gap size X and the distance L relative to the distance L obtained from the width of the cage in the radial direction. The above condition is more desirably satisfied on both of the inner diameter side and the outer diameter side. Further, X/L≤5.0% is desirable in order to set the movement amount of the cage in the radial direction in a necessary range.

In the present embodiment, three first pockets 41A are provided and ten second pockets 41B are provided. The number of the first pockets 41A and the number of the second pockets 41B are not limited and may be arbitrary set.

The number of the first pockets 41A is preferably two or more, more preferably three or more for stability of the cage, and is preferably half of all, pockets or less, more preferably four or less, and even more preferably three or less in order to reduce oil particles. In order to reduce the movement amount of the cage 33A in the radial direction, the first pockets 41A are preferably provided at equal intervals or at equal intervals as much as possible in the circumferential direction of the cage.

In the ball bearing 14 having the above configuration, the crown cage 33A includes the first pocket 41A and the second pocket 41B. Accordingly, the movement amount of the cage 33A in the radial direction can be reduced and oil particles can be reduced as compared with the general cage. When all pockets of the crown cage 33A have the shape of the second pocket 41B, the movement amount of the cage in the radial direction is expected to increase as compared with the general cage. When the movement amount of the cage in the radial direction increases, the cage collides with the outer ring or the inner ring, which may affect performance of the bearing such as torque and sound. Further, the collision between the outer ring or the inner ring and the cage to which the grease adheres to causes new oil particles. For this reason, it is necessary to appropriately provide the first pocket 41A to reduce the movement amount of the cage 33A in the radial direction.

According to the ball bearing 14 and the bearing unit 10 in the present embodiment as described above, the gap on each of the outer circumferential surface side and the inner circumferential surface side of the cage between the ball 32 and the inner circumferential surface of the second pocket 41B is larger than the gap on each of the outer circumferential surface side and the inner circumferential surface side of the cage between the ball 32 and the inner circumferential surface of the first pocket 41A. Accordingly, the grease is prevented from being scrapped by the cage 33A and oil particles can be reduced. Since the first pocket 41A that is a spherical pocket is provided at substantially equal intervals in the circumferential direction of the cage 33A, the movement amount of the cage 33A in the radial direction can be reduced.

According to the ball bearing 14 and the bearing unit 10 in the present embodiment, the relationship between the gap size X and the distance L is 1.8%≤X/L≤5.0%. Accordingly, oil panicles can be reduced and the movement amount of the gage 33A in the radial direction can be kept within a necessary range.

The present invention is not limited to the embodiment described above and may be appropriately modified without departing from the scope of the present invention.

Examples

In order to confirm effects of the present invention, a pivot bearing unit including a cage (example of the present invention) including a first pocket and a second pocket and a pivot bearing unit including a cage (example of the related art) including only the first pocket were prepared, and an oil particles confirmation test was performed on both of the two pivot bearing, units.

In the example of the present invention, three of thirteen pockets were defined as the first pocket and ten were defined as the second pocket. Regarding the relationship between the gap size X and the distance L, the first pocket satisfied X/L=1.3% and the second pocket satisfied X/L=2.5%. The first pocket had the same radius of curvature as the pocket in the example of the related art. The second pocket had a larger radius of curvature than the first pocket and the X/L was increased.

In this test, each of the pivot bearing units was reciprocated for predetermined time, and then the total number of oil particles generated from the pivot bearing unit and detected by a measuring device was confirmed. Test results are shown in FIG. 8.

Figure 8:
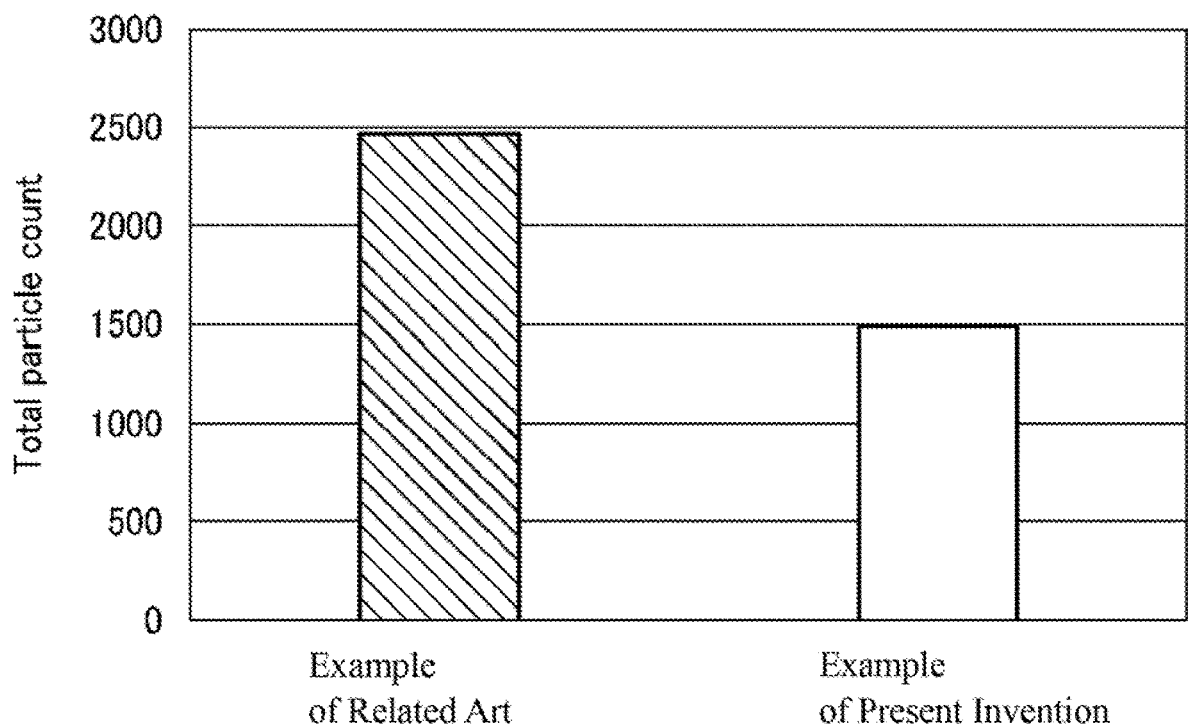
FIG. 8 is a graph showing results of an oil particles confirmation test.

As is apparent from FIG. 8, about 2450 oil particles were detected in the example of the related art and about 1500 oil particles were detected in the example of the present invention. Therefore, the effectiveness of the present invention by ensuring a gap between the edge portion of the second pocket and the ball was demonstrated.

The present application is based on a Japanese patent application (No. 2016-016277) filed on Feb. 1, 2018, contents of which are incorporated by reference in this application.

REFERENCE SIGNS LIST 10 pivot bearing unit
12 shaft
14 ball bearing
18 sleeve
20 spacer
30 inner ring
31 outer ring
32 ball
33A crown cage
34 shield member
41A first pocket
41B second pocket
42 body
43 pillar portion
44 claw portion
E edge portion
P contact point

The invention claimed is:

1. A ball bearing comprising:
an inner ring;
an outer ring;
a plurality of balls rollably provided between the inner ring and the outer ring; and
a cage configured to hold the plurality of balls at equal intervals in a circumferential direction, wherein
the cage includes a plurality of pockets configured to hold the balls,
the plurality of pockets include at least two types of pockets including a first pocket and a second pocket,
a gap on each of an outer circumferential surface side and an inner circumferential surface side of the cage between the ball and an inner circumferential surface of the second pocket is larger than a gap on each of the outer circumferential surface side and the inner circumferential surface side of the cage between the ball and an inner circumferential surface of the first pocket, and
a radius of curvature of the inner circumferential surface of the second pocket is 1.06 to 1.10 times a radius of the ball.

2. The ball bearing according to claim 1, wherein
a radius of curvature of the inner circumferential surface of the first pocket is 1.02 to 1.06 times a radius of the ball.

3. A bearing unit in which the ball bearing according to claim 2 is incorporated.

4. A bearing unit in which the ball bearing according to claim 1 is incorporated.

5. The ball bearing according to claim 1, wherein
the clearance dimension X and the distance L is X/L 5.0%.

6. A ball bearing comprising:
an inner ring;
an outer ring;
a plurality of balls rollably provided between the inner ring and the outer ring; and
a cage configured to hold the plurality of balls at equal intervals in a circumferential direction, wherein
the cage includes a plurality of pockets configured to hold the balls,
the plurality of pockets include at least two types of pockets including a first pocket and a second pocket,
a gap on each of an outer circumferential surface side and an inner circumferential surface side of the cage between the ball and an inner circumferential surface of the second pocket is larger than a gap on each of the outer circumferential surface side and the inner circumferential surface side of the cage between the ball and an inner circumferential surface of the first pocket, and
defining a gap size in the circumferential direction from the edge portion of the second pocket to a surface of the ball in a state where the ball moves in a rotation direction of the ball bearing and the pocket and the ball are in contact as X, and defining a distance in the radial direction from the pitch circle diameter of the pocket of the cage to the radial edge of the cage as L, the clearance dimension X and the distance L is $1.8\% \leq X/L$.

7. The ball bearing according to claim 6, wherein
the clearance dimension X and the distance L is $X/L \leq 5.0\%$.

* * * * *